United States Patent [19]

Van Duser

[11] Patent Number: 4,645,160
[45] Date of Patent: Feb. 24, 1987

[54] CAM OPERATED LOCKING DEVICE

[75] Inventor: Harold J. Van Duser, Reedsburg, Wis.

[73] Assignee: Seats Incorporated, Reedsburg, Wis.

[21] Appl. No.: 725,301

[22] Filed: Apr. 19, 1985

[51] Int. Cl.⁴ ............................................. F16M 13/00
[52] U.S. Cl. ..................................... 248/429; 292/60
[58] Field of Search ..................... 248/429, 408, 412; 211/4; 292/60, 61

[56] References Cited

U.S. PATENT DOCUMENTS

| 824,193 | 9/1931 | Bovington | 248/429 |
|---|---|---|---|
| 969,825 | 9/1910 | Wilshire . | |
| 1,684,944 | 9/1928 | Chapman | 248/429 |
| 1,921,224 | 8/1933 | Floraday | 248/429 |
| 2,066,557 | 1/1937 | Cox | 248/429 |
| 2,154,294 | 4/1939 | Whedon . | |
| 3,362,738 | 1/1968 | Dygert et al. . | |
| 3,627,253 | 12/1971 | Germala . | |
| 3,858,834 | 1/1975 | Eimen . | |
| 4,113,221 | 9/1978 | Wehner . | |
| 4,165,854 | 8/1979 | Duly . | |

FOREIGN PATENT DOCUMENTS 639845 3/1928 France ................................. 292/60

Primary Examiner—Ramon S. Britts
Assistant Examiner—Sarah A. Lechok Eley
Attorney, Agent, or Firm—Allegretti, Newitt, Witcoff & McAndrews, Ltd.

[57] ABSTRACT

A cam operated locking device for selectively locking or releasing an isolator frame for a seat that is slidable longitudinally on a support. The seat includes insolator frame has a locking recess therein. The locking device includes a U-bar housing affixed to a bracket on the support. There is a lever rod rotatable and slidable within the U-bar housing that is adapted to engage the recess in said isolator frame for locking the seat with respect to the bracket. Cam means including at least one pair of cam surfaces are formed on the U-bar housing. The lever rod carries a pin, which extends transversely within the U-bar housing and cooperates with the cam means. Spring means are disposed about the lever rod for biasing the lever rod into the recess in the seat frame. A handle is secured to the lever rod for rotating same. When the lever rod is in a first position on the cam means, the spring means will bias the lever rod into engagement with the recess. When the lever rod is rotated to a second overcenter position, the lever rod will be moved and retained out of engagement with the recess.

12 Claims, 4 Drawing Figures

U.S. Patent  Feb. 24, 1987  4,645,160
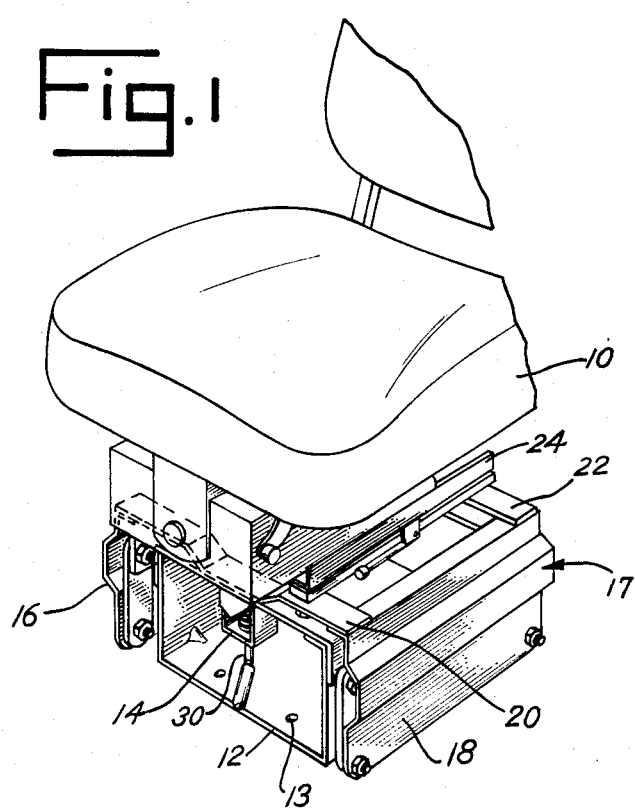
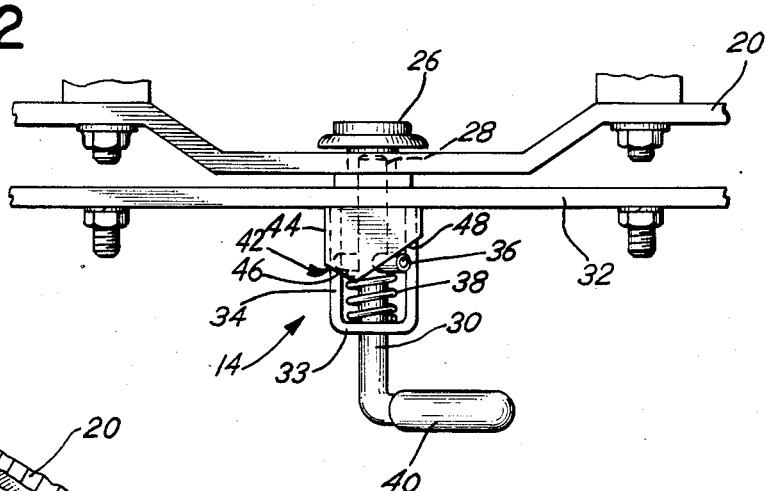
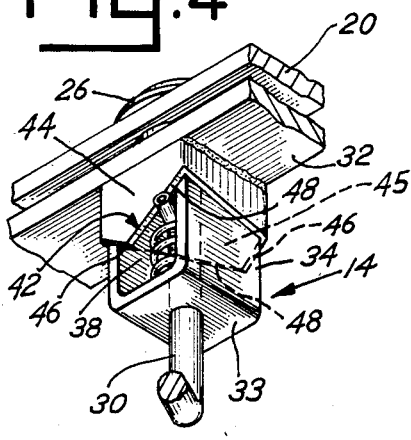
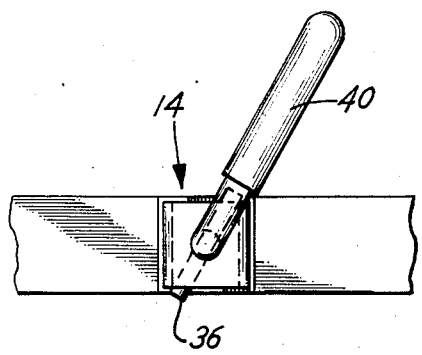

CAM OPERATED LOCKING DEVICE

BACKGROUND OF THE INVENTION

The present invention pertains to a cam operated locking device for interlocking two relatively movable elements, for example a vehicle seat and its support.

In certain industrial equipment, for example, an over-highway truck, it is desired to isolate movement of the operator's seat. The seat is adjustably mounted on a frame, which is slidably carried on a support or riser box to isolate the seat and operator from jarring movement by the machinery or vehicle. A locking device is used to lock the seat frame in position when the operator desires to prevent the seat from sliding on its support and thus stopping the isolating function. Present locking devices are relatively complex and costly.

Prior art patents reveal various forms of chair or seat locking arrangements, but none teaches or suggests the invention disclosed and claimed herein. Duly U.S. Pat. No. 4,165,854 discloses a locking device having a cam operator for moving a pin and thereby engaging and disengaging a locking pin from a socket. The pin is held in contact with the cam operator by means of a spring. A similar mechanism is shown in Wehner U.S. Pat. No. 4,113,221. As will be shown more particularly hereianfter, the present invention is not taught or suggested by these references.

An object of the present invention is to provide for a vehicle seat (e.g., an off-highway truck seat) an improved cam operated locking device that can be biased to a locking position and retained in an unlocked position by cam means.

Another object of the present invention is to provide an improved cam operated locking device for a seat that carries a frame having a recess therein, said locking device including a U-bar housing having a lever rod rotatably and reciprocably carried in said U-bar housing and adapted to engage with, and be disengaged from, said recess, a pin on said lever rod engaging cam means on said U-bar housing, spring means biasing the lever rod toward said recess, said cam means cooperating with said pin to permit said lever rod to be biased into said recess when said lever rod is in a first position and to lock said lever rod away from said recess when said lever rod is in a second position. Other objects and advantages of the present invention will be made more apparant hereianfter.

BRIEF DESCRIPTION OF THE DRAWING

There is illustrated in the attached drawing a presently preferred embodiment of the present invention wherein like numerals in the various views refer to like elements and wherein;

FIG. 1 is a right front perspective view of a seat mounted on a riser box in a vehicle and illustrating the cam operated locking device of the present invention;

FIG. 2 is a detailed front view of the cam operated locking device illustrating the lever rod in a recess in the seat frame so as to lock the seat against movement relative to the riser box;

FIG. 3 is a bottom view of the cam operated locking device; and

FIG. 4 is a right front perspective view of the cam operated locking device illustrated from the bottom.

DETAILED DESCRIPTION OF THE PRESENT INVENTION

Referring to FIG. 1 there is illustrated a seat 10 which is adapted to be slidably mounted upon a riser box 12 that is secured to a frame, (e.g., the floor of the vehicle) by suitable fastening means, (e.g., bolts extending through holes 13 in the bottom of the riser box into the vehicle floor). The seat 10 includes an isolator frame 17 depending therefrom for permitting sliding movement of the seat with respect to the riser box 12. The present invention concerns a cam operating locking mechanism 14 which secures the isolator frame 17 to the riser box 12 and is separate from the normal mechanism for securing the seat 10 to the slide rails 24.

The isolator frame 17 for the seat 10 includes depending side members 16 and 18 which are interconnected by cross members 20 and 22. Slide rails 24 permit longitudinal sliding of the seat 10 with respect to the frame 17. The isolator frame 17 is longitudinally slidable with respect to the riser box 12. The cam operating locking device 14 is operative to secure the riser box 12 to the frame 17 for the seat 10 to prevent sliding of the seat on the riser box 12, or alternatively, to permit the cam operated locking device 14 to be locked out so as to permit sliding motion of the seat isolator frame 17 with respect to the riser box or support 12.

The structure and operation of the cam operated locking device 14 will be better understood by reference to FIGS. 2, 3 and 4. The isolator frame 17 includes a cross member 20 that is provided centrally with an insert 26 having a recess 28 therein for receiving the end of the lever rod 30 of the cam operated locking device 14.

The cam operated locking device 14 is secured to bracket means 32 which forms part of the riser box 12. The U-bar housing 34 of the cam operated locking device is secured to the bracket 32. The lever rod 30 is both reciprocably and rotatably secured within the U-bar housing 34. Further, the U-bar housing 34 is constructed and arranged to position the lever rod 30 axially with respect to the recess or opening 28. Secured transversely of the lever rod 30 within the U-bar housing 34 is a pin 36. The pin 36 may be hollow as shown, or alternatively, the pin 36 may be solid. A coil spring 38 is disposed on the lever rod 30 and is mounted between the bight 33 of the U-bar housing 34 and the pin 36. The coil spring 38 functions to bias the lever rod 30 into the recess 28 of the frame cross member 20. The end of the lever rod 30 is formed as a handle 40 to facilitate rotation of the lever rod 30.

Cam means 42 are formed on the U-bar housing 34 for properly positioning the lever rod 30 with respect to the recess 28 as desired by the operator. The cam means 42 are defined on the wall means 44 which extend from the bottom of the bracket 32. The cam means 42 comprise a first cam surface 46 and a second cam surface 48. It will be understood that there is an opposed cam surface 46 and 48 on the opposite wall 45. In a preferred embodiment of the present invention, the cam surfaces 46 and 48 are essentially opposed diagonal, or opposed inclined, planar surfaces.

FIG. 2 shows the position of the cam operated locking device 14 with the end of the lever rod 30 in engagement within the recess 28 in the insert member 26. In this position, the isolator frame 17 and the seat 10 carried thereby are locked with respect to the riser box 12. The pin 36 which extends transversely of the lever rod 30 is positioned against the opposed cam surfaces 48 on the wall means 44 and 45. Spring 38 operates between the bight 33 of the U-bar housing 44 and the pin 36 to bias the lever rod 30 upwardly, as viewed in FIG. 2, into engagement with the recess 28.

When it is desired to release the end of the lever rod 30 from the recess 28, the handle 40 is rotated so as to move the pin 36 downwardly on the inclined surfaces 48. Upon such rotation, the end of the lever rod 30 is disengaged from the recess 28 and the isolator frame 17 can be moved. If it is desired to lock the lever rod 30 out of engagement with the recess 28, the pin 36 is moved over center from cam surface 48 onto the cam surface 46. The spring 38 is compressed and the pin 36 will be held on cam surface 46 between the opposed surface 46 and the U-bar housing 34 in order to hold the end of the lever rod 30 out of engagement with the recess 28.

It will be understood that when the pin 36 is moved from cam surface 46 onto cam surface 48, the spring 38 will bias the pin 36 and the lever rod 30 upwardly until the upper end of lever rod 30 is seated in the recess.

A person skilled in the art will appreciate that the seat 10 can be separately adjusted for tilt, as well as fore and aft positioning with respect to the frame 17. Such adjustments are known in the art and form no part of the present invention.

There has been provided by the present invention a simplified, cam operated locking device for selectively locking an off-road vehicle seat (e.g., a seat having an isolator frame movable with respect to a riser box). The cam operated locking device of this invention comprises very few parts, is very easy to assemble and operate, and results in significantly less manufacturing costs and better reliability in use.

While I have shown a presently preferred embodiment of the present invention, it will be understood that the invention may be otherwise embodied within the scope of the following claims.

What is claimed is:

1. An improved cam operated locking device for a seat movable longitudinally on a support means and having a recess therein, the seat having bracket means, the improved locking device being secured to the bracket means and including a U-bar housing, cam means formed on said U-bar housing, a lever rod in said U-bar housing adapted to engage said recess in said seat for locking said seat with respect to said support means, a pin fixed transversely to said lever rod within said U-bar housing and cooperating with the cam means on said U-bar housing, spring means for urging the lever rod into position in the said recess, and means for rotating the lever rod in a first direction to slide the pin on the cam means to move the lever rod away from the recess against the bias of the spring means, with rotation of the lever rod in the opposite direction permitting the spring means to bias the lever rod into engagement with the recess, said U-bar housing being secured to the bracket means, said cam means surrounding the lever rod, spring means, and U-bar housing, and said spring means surrounding said lever rod to engage the bracket means at one end and the transverse pin at the other end.

2. A cam operated locking device as in claim 1 wherein the cam means are formed on opposed surfaces of the U-bar housing.

3. A cam operated locking device as in claim 2 wherein the pin extends from both sides of the lever rod and engages the cam means on the opposed surfaces.

4. A cam operated locking device as in claim 2 wherein the opposed surfaces are formed on opposed walls extending from the bracket means.

5. A can operated locking device as in claim 4 wherein the spring means is disposed about the lever rod between the pin and the bight portion of the U-bar housing.

6. A cam operated locking device as in claim 5 wherein the rotating means includes a lever handle joined to the lever rod.

7. A cam operated locking device as in claim 4 wherein the opposed surfaces include first cam surfaces and second cam surfaces on the opposed walls, the pin sliding on the first cam surfaces for enabling the lever rod to move toward the recess and the pin engaging the second cam surfaces for maintaining the lever rod in position away from the recess.

8. A cam operated locking device as in claim 7 wherein the first and second cam surfaces are formed as inclined planar surfaces.

9. A cam operated locking device for a seat movable longitudinally on a riser box, said seat having a recess therein, bracket means, and the locking device secured to the bracket means, said locking device including a U-bar housing, cam means formed on opposed surfaces of said U-bar housing, a lever rod in said U-bar housing adapted to engage said recess in said seat frame for locking said seat frame with respect to said bracket means, a pin fixed transversely to said lever rod within said U-bar housing and extending from said lever rod for cooperating with said opposed surfaces of said cam means, spring means for urging the lever rod into position in the said recess, and means for rotating the lever rod in a first direction to slide the pin on the cam means to an overcenter position to retain the lever rod away from the recess against the bias of the spring means, with rotation of the lever rod in the opposition direction permitting the spring means to bias the lever rod into engagement with the recess, said U-bar housing being secured to the bracket means, said cam means surrounding the lever rod, spring means, and U-bar housing, and said spring means surrounding said lever rod to engage the bracket means at one end and the transverse pin at the other end.

10. A cam operated locking device as in claim 9 wherein the opposed surfaces are formed on walls of the U-bar housing extending from the bracket means.

11. A cam operated locking device as in claim 10 wherein the spring means is disposed about the lever rod between the pin and the bight portion of the U-bar housing.

12. A cam operated locking device as in claim 11 wherein the opposed surfaces include first cam surfaces and second cam surfaces, the pin sliding on the first cam surfaces for enabling the lever rod to be biased by the spring means move into engagement with the recess and for moving the lever rod from engagement within the recess and the pin engaging the second cam surfaces for maintaining the lever rod in position away from the recess.

* * * * *